(12) United States Patent
Numata

(10) Patent No.: US 8,474,498 B2
(45) Date of Patent: Jul. 2, 2013

(54) PNEUMATIC TIRE

(75) Inventor: Kazuki Numata, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 352 days.

(21) Appl. No.: 12/830,873

(22) Filed: Jul. 6, 2010

(65) Prior Publication Data

US 2011/0041973 A1    Feb. 24, 2011

(30) Foreign Application Priority Data

Aug. 21, 2009  (JP) ................ 2009-192378

(51) Int. Cl.
*B60C 11/13*  (2006.01)
*B60C 11/12*  (2006.01)
*B60C 11/11*  (2006.01)

(52) U.S. Cl.
USPC .............. 152/209.18; 152/209.2; 152/209.25; 152/209.28

(58) Field of Classification Search
USPC ......... 152/209.18, 902, 209.2, 209.3, 209.28, 152/209.25, 209.9, 209.16, 209.8
See application file for complete search history.

(56) References Cited

U.S. PATENT DOCUMENTS

| 4,619,300 | A |   | 10/1986 | Tokunaga et al. |
| 5,582,661 | A | * | 12/1996 | Winter .................... 152/209.18 |
| 5,647,926 | A | * | 7/1997 | van der Meer et al. .. 152/209.18 |
| 2006/0207702 | A1 |   | 9/2006 | Miyazaki |
| 2008/0202658 | A1 |   | 8/2008 | Ikeda et al. |

FOREIGN PATENT DOCUMENTS

EP    1961586 A1    8/2008

OTHER PUBLICATIONS

Extended Eurpoean Search Report dated Dec. 27, 2010, for corresponding European Application No. 10007870.8, seven (7) pages.

* cited by examiner

*Primary Examiner* — Eric Hug
(74) *Attorney, Agent, or Firm* — Birch, Stewart, Kolasch & Birch, LLP

(57) ABSTRACT

A pneumatic tire (1) provided in the tread portion (2) with a row (5R) of crown blocks (5b) divided by crown axial grooves (8), two rows (6R) of middle blocks (6b) divided by middle axial grooves (9), and two rows (7R) of shoulder blocks (7b) divided by shoulder axial grooves (10), Each of the crown axial grooves (8) is circumferentially aligned with one of the middle axial grooves (9) such that the crown axial groove (8) is positioned within a middle-axial-groove range (Mc) defined between 1st and 2nd axial straight lines (Za and Zb) which are drawn passing through 1st and 2nd extreme circumferential end points (9a and 9b) of the middle axial groove (9), respectively. The circumferential length of the middle-axial-groove range (Mc) is not less than 25% but not more than 50% of a pitch length (P) defined between the two 1st extreme circumferential end points (9a and 9a). The middle-axial-groove range (Mc) does not overlap with any of the shoulder axial grooves (10).

7 Claims, 7 Drawing Sheets (Ref. 1)

(Ref. 2)

PNEUMATIC TIRE

BACKGROUND OF THE INVENTION

The present invention relates to a pneumatic tire, more particularly to an arrangement of axial tread grooves suitable for a studless tire capable of providing good road grip on both of icy and snowy roads.

In recent years, various studless tires provided in the tread portion with a large number of sipes are widely used as winter tires suitable for running on well-paved roads in order to avoid dust pollution.

Such sipes can provide good road grip when running on relatively flat and hard road surfaces covered with icy and/or a water film. But, when running on road surfaces covered with a certain depth of snow, it is difficult for the sipes to provide good road grip.

If the grooved area (especially of axial grooves) in the tread portion is increased, on-the-snow grip may be improved, but tire performances, for example, maneuverability, grip, running stability and the like during running on the above-mentioned relatively flat and hard road surfaces are liable to deteriorate.

SUMMARY OF THE INVENTION

It is therefore, an object of the present invention to provide a pneumatic tire, which can provide good road grip on the snowy roads without sacrificing other tire performances, e.g. on-the-icy grip performance.

According to the present invention, a pneumatic tire comprises a tread portion provided on each side of a tire equator with an axially inner crown main groove and an axially outer shoulder main groove which extend continuously in the tire circumferential direction so that the tread portion is axially divided into one crown land portion between the crown main grooves, two middle land portions between the crown main grooves and shoulder main grooves, and two shoulder land portions between the shoulder main grooves and tread edges, wherein the crown land portion is circumferentially divided into a row of circumferentially arranged crown blocks by crown axial grooves, each of the middle land portions is circumferentially divided into a row of circumferentially arranged middle blocks by middle axial grooves, and each of the shoulder land portions is circumferentially divided into a row of circumferentially arranged shoulder blocks by shoulder axial grooves.

Each of the crown axial grooves is aligned with one of the middle axial grooves on one side and the other side of the tire equator such that the above-mentioned each crown axial groove is positioned within a middle-axial-groove range which is defined by the above-mentioned one middle axial groove as being between 1st and 2nd axial straight lines which are drawn passing through 1st and 2nd extreme circumferential end points of the above-mentioned one middle axial groove, respectively, wherein
the circumferential length of the middle-axial-groove range is not less than 25% but not more than 50% of a pitch length of the middle axial grooves, the pitch length defined between the above-mentioned 1st extreme circumferential end point and that of the middle axial groove next to the above-mentioned 2nd extreme circumferential end point.

The middle-axial-groove range which is defined by the above-mentioned one middle axial groove does not overlap with any of the shoulder axial grooves formed on the same side of the tire equator as the above-mentioned one middle axial groove.

Therefore, each of the crown axial grooves is aligned with at least one of the middle axial grooves in the tread central region where the ground pressure becomes relatively high. As a result, the snow on the road surface packed into the crown axial groove and middle axial groove can form a large block capable of bringing a large shearing force. Thus, it is possible to provide good road grip during running on the snowy roads.

The middle-axial-groove range which corresponds to the circumferential extent of the middle axial groove has a relatively high percentage of 25 to 50%. Accordingly, the circumferential component of the middle axial groove becomes relatively long, therefore, good grip can be provided on the snowy roads during straight running as well as cornering.

Since the shoulder axial grooves are circumferentially shifted from the aligned crown axial grooves and middle axial grooves, a snow shearing force derived from the shoulder axial groove can be obtained successively, thereby on-the-snow performance is further improved.

In this application including the following description and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch (camber angle=0) in the normally inflated loaded condition.

The undermentioned tread width TW is the axial distance between the tread edges Te measured in the normally inflated unloaded condition of the tire.

DESCRIPTION OF THE PREFERRED EMBODIMENTS

Embodiments of the present invention will now be described in detail in conjunction with the accompanying drawings.

The pneumatic tire 1 according to the present invention comprises: a tread portion 2 having an radially outer surface defining a tread surface and tread edges Te; a pair of axially spaced bead portions each with a bead core therein; a pair of sidewall portions extending between the tread edges Te and the bead portions; a carcass extending between the bead portions through the tread portion and sidewall portions; and a tread reinforcing belt disposed radially outside the carcass in the tread portion, as well known in the art.

In this embodiment, the pneumatic tire 1 is a studless radial tire for passenger cars.

The tread portion 2 is provided with a unidirectional tread pattern bounded by a designed or intended tire rotational direction R. The designated tire rotational direction R is indicated in the sidewall portions by the use of letters, mark and the like.

The unidirectional tread pattern in this embodiment is a mirror symmetric about the tire equator C.

Figure 1:
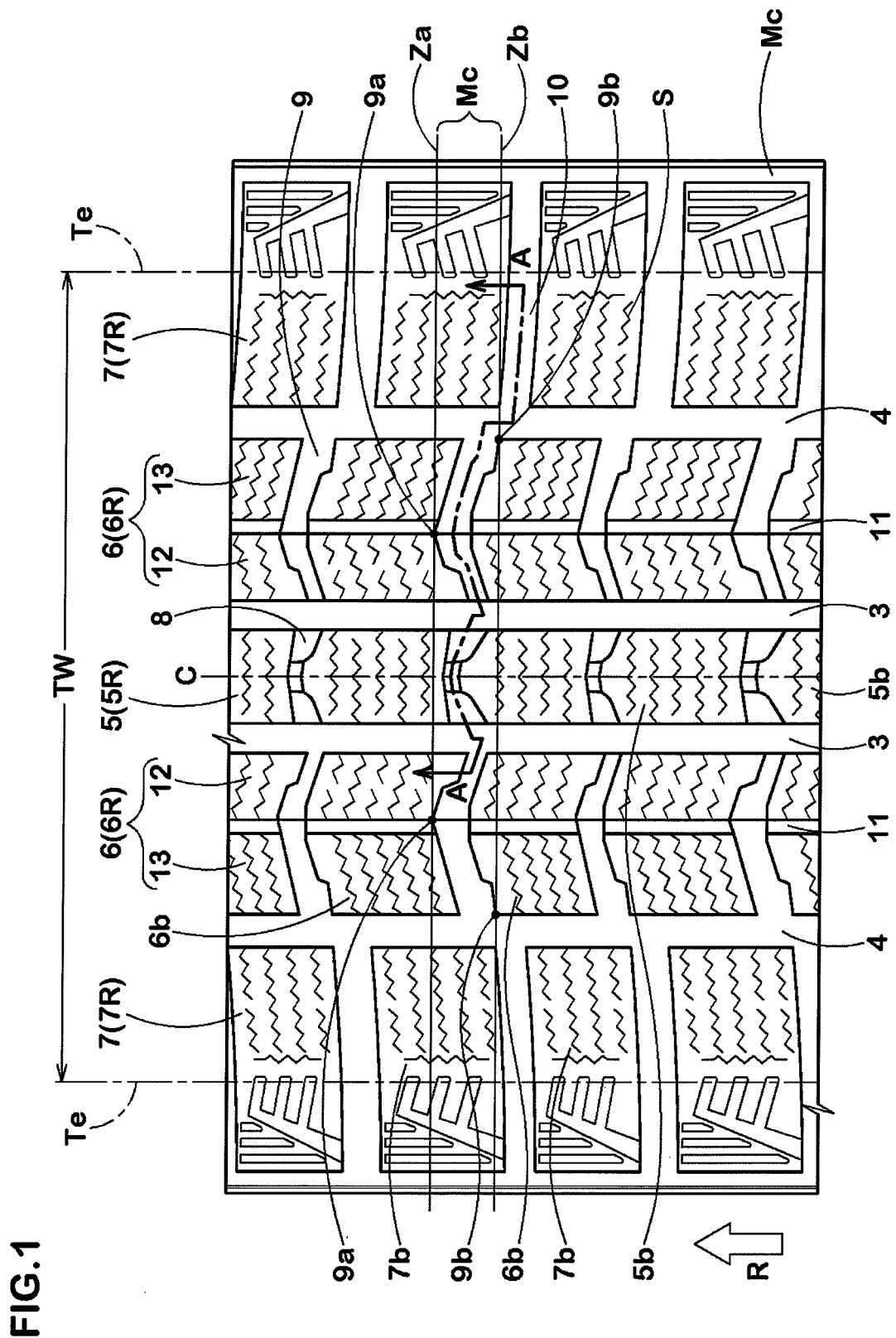
FIG. 1 is a developed partial view of a tread portion of a pneumatic tire according to the present invention.
Figure 2:
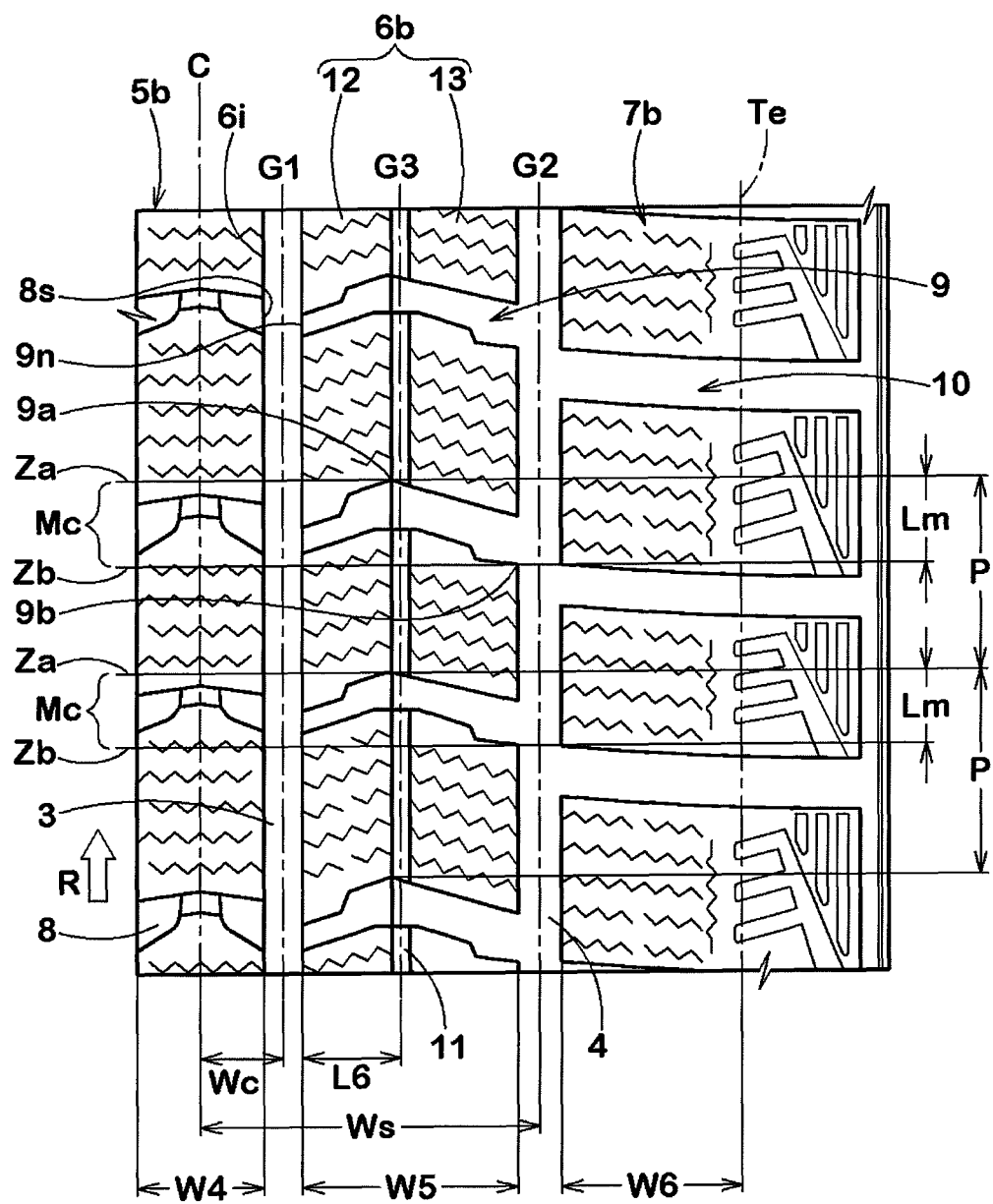
FIG. 2 is an enlarged partial view of the tread portion.

The tread portion 2 is, as shown in FIG. 1 and FIG. 2, provided with a crown main groove 3 disposed on each side of the tire equator C and extending continuously in the tire circumferential direction, and a shoulder main groove 4 disposed on each side of the tire equator C and axially outside the crown main groove 3 and extending continuously in the tire circumferential direction.

In this embodiment, in order to obtain good drainage and snow-self-ejecting performance, the crown main grooves 3 and shoulder main grooves 4 are formed as straight grooves extending parallel with the tire circumferential direction.

Figure 3:
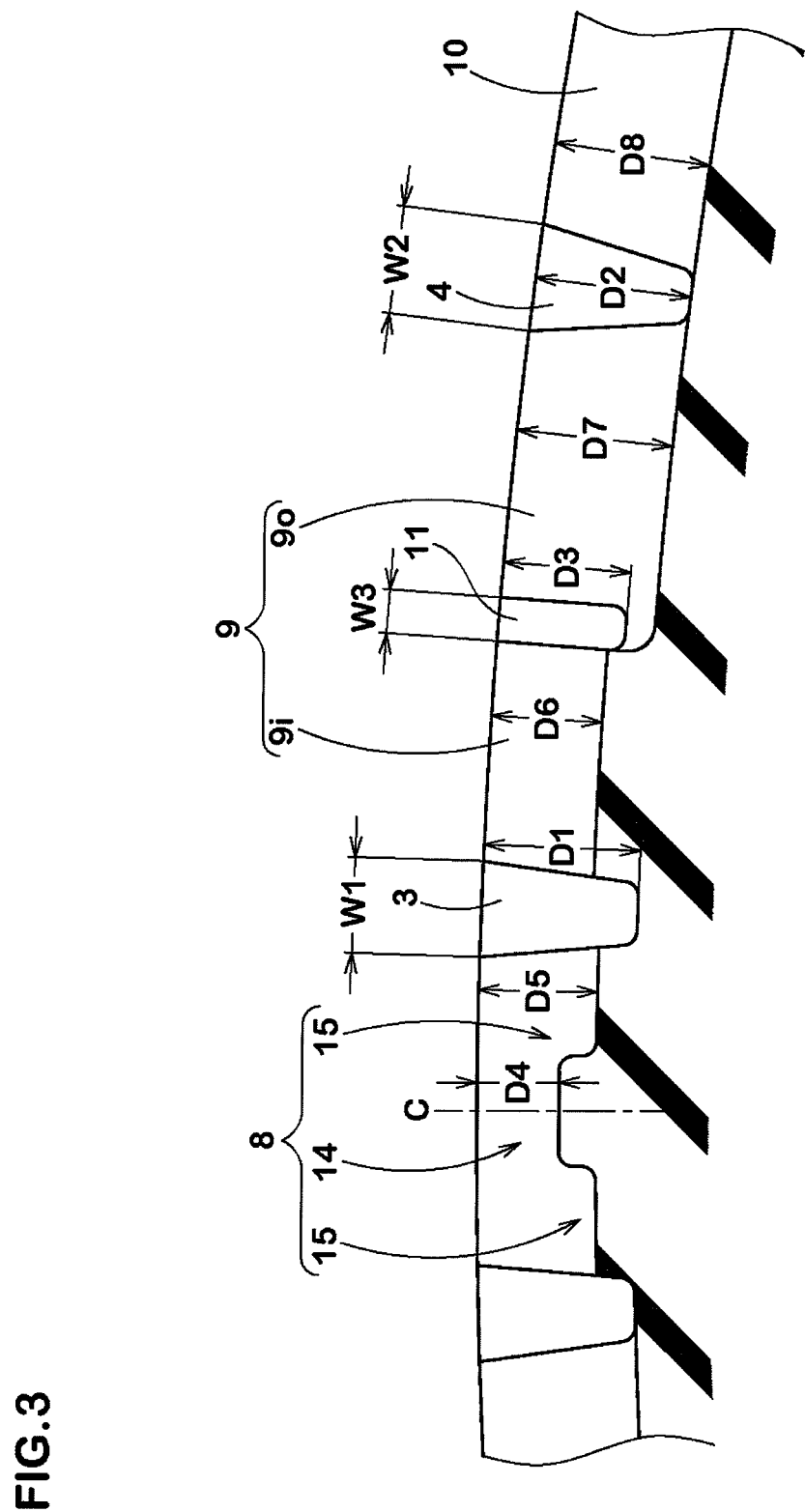
FIG. 3 is a cross sectional view taken along line A-A of FIG. 1.

Further, in order to provide rigidity for the undermentioned blocks without sacrificing the snow-self-ejecting performance, as shown in FIG. 3, the axial width W1 of the crown main groove 3 is set in a range of from 2.5 to 4.5% of the tread width TW, and the axial width W2 of the shoulder main groove 4 is set in a range of from 3.0 to 5.0% of the tread width TW.

Furthermore, in order to provide good grip on the icy roads, the axial width W1 of the crown main groove 3 is set to be smaller than the axial width W2 of the shoulder main groove 4.

In the case of a studless tire for passenger cars, it is preferable that, as shown in FIG. 3, the groove depth D1 of the crown main grooves 3 and the groove depth D2 of the shoulder main grooves 4 are set in a range of from 8.0 to 14.0 mm. In this embodiment, the groove depth D1 is the same as the groove depth D2. (D1=D2=11.2 m)

In the tread portion 2, therefore, the following five land portions are defined:

a crown land portion 5 between the crown main grooves 3, two middle land portions 6 between the crown main grooves 3 and the shoulder main grooves 4, and two shoulder land portions 7 axially outside the shoulder main grooves 4.

As to the axial positions of the crown main grooves 3 and shoulder main grooves 4, in order to improve rigidity balance among the land portions 5, 6 and 7, and improve the steering stability and wear resistance, it is preferred that, as shown in FIG. 2, the axial distance Wc between the widthwise center line G1 of the crown main groove 3 and the tire equator C is not less than 4%, more preferably not less than 6%, but not more than 12%, more preferably not more than 10% of the tread width TW, and the axial distance Ws between the widthwise center line G2 of the shoulder main groove 4 and the tire equator C is not less than 26%, more preferably not less than 28%, but not more than 38%, more preferably not more than 36% of the tread width TW.

The crown land portion 5 is circumferentially divided into a row 5R of circumferentially arranged crown blocks 5b by a plurality of crown axial grooves 8 extending across the entire axial width of the crown land portion 5.

Each of the middle land portions 6 is circumferentially divided into a row 6R of circumferentially arranged middle blocks 6b by a plurality of middle axial grooves 9 extending across the entire axial width of the middle land portion 6.

Each of the shoulder land portions 7 is circumferentially divided into a row 7R of circumferentially arranged shoulder blocks 7b by a plurality of shoulder axial grooves 10 extending across the entire axial width of the shoulder land portion 7.

Figure 4:
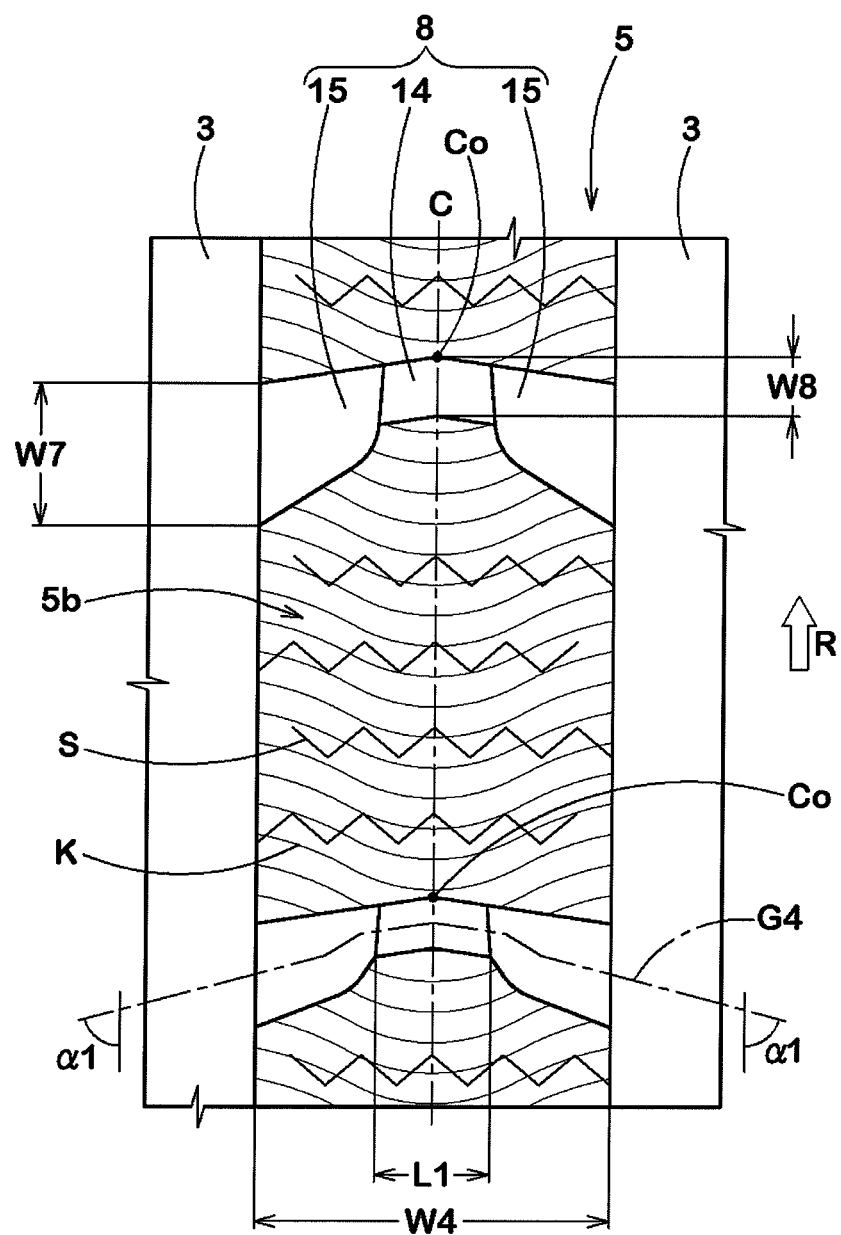
FIG. 4 is an enlarged top plan view of a part of a crown block row.

All of the crown axial grooves 8 in this embodiment have a same configuration as shown in FIG. 4.

Towards the designated tire rotational direction R, each of the crown axial grooves 8 is curved concavely so as to have a generally V-shape configuration.

Due to such V-shape configuration, the crown axial grooves 8 can lead water and sherbet snow existing between the crown land portion and the road surface smoothly to the crown main grooves 3, utilizing the ground pressure because, during running forward, each of the crown axial grooves 8 enters into the ground contacting area from the vertex Co of the V-shape firstly to the axial ends lastly. Further, as the total length of the groove edges is increased, the grip performance on the icy roads may be improved.

In this embodiment, further, the vertex Co of the V-shape is positioned at the tire equator C, and the crown axial groove 8 is formed symmetrically about the tire equator C. Therefore, running stability during straight running and the uneven wear resistance of the crown block 5b may be improved because the crown blocks or the crown land portion is evened in the rigidity between the both sides of the tire equator.

The crown axial groove 8 is, as shown in FIG. 3 and FIG. 4, made up of a central part 14 having a groove depth D4 and a circumferential width W8, and a pair of lateral parts 15 positioned one on each side of the central part 14, and having a groove depth D5 and a circumferential width W7 which are more than the groove depth D4 and groove width W8, respectively.

(D5>D4, and W7>W8)

Preferably, the Groove Depth D5 is not Less than 150%, More preferably not less than 160%, but not more than 170%, more preferably not more than 165% of the groove depth D4.

Thereby, the drainage and snow-self-ejecting performance may be derived without decreasing the rigidity of the crown land portion 5.

For that purpose, preferably, the groove depth D4 of the central part 14 is set in a range of from 40 to 60% of the groove depth D1 of the crown main groove 3. The groove depth D5 of the lateral part 15 is set in a range of from 65 to 85% of the groove depth D1 of the crown main groove 3. The axial length L1 of the central part 14 is set in a range of from 20 to 40% of the width W4 of the crown land portion 5.

In order to improve the uneven wear resistance and drainage, it is preferred that the groove width W7 of the lateral part 15 at the axial ends opening to the crown main groove 3 is not less than 1.2 times, more preferably not less than 1.5 times, but not more than 3.0 times, more preferably not more than 2.7 times the groove width W8 of the central part 14 at the vertex Co (or at the tire equator).

The angle α1 of the widthwise center line G4 of the crown axial groove 8 is preferably set in a range of from 50 to 80 degrees with respect to the circumferential direction.

If the angle α1 is more than 80 degrees, then the snow-self-ejecting performance tends to deteriorate. If the angle α1 is less than 50 degrees, then the grip performance during straight running tends to deteriorate.

Figure 5:
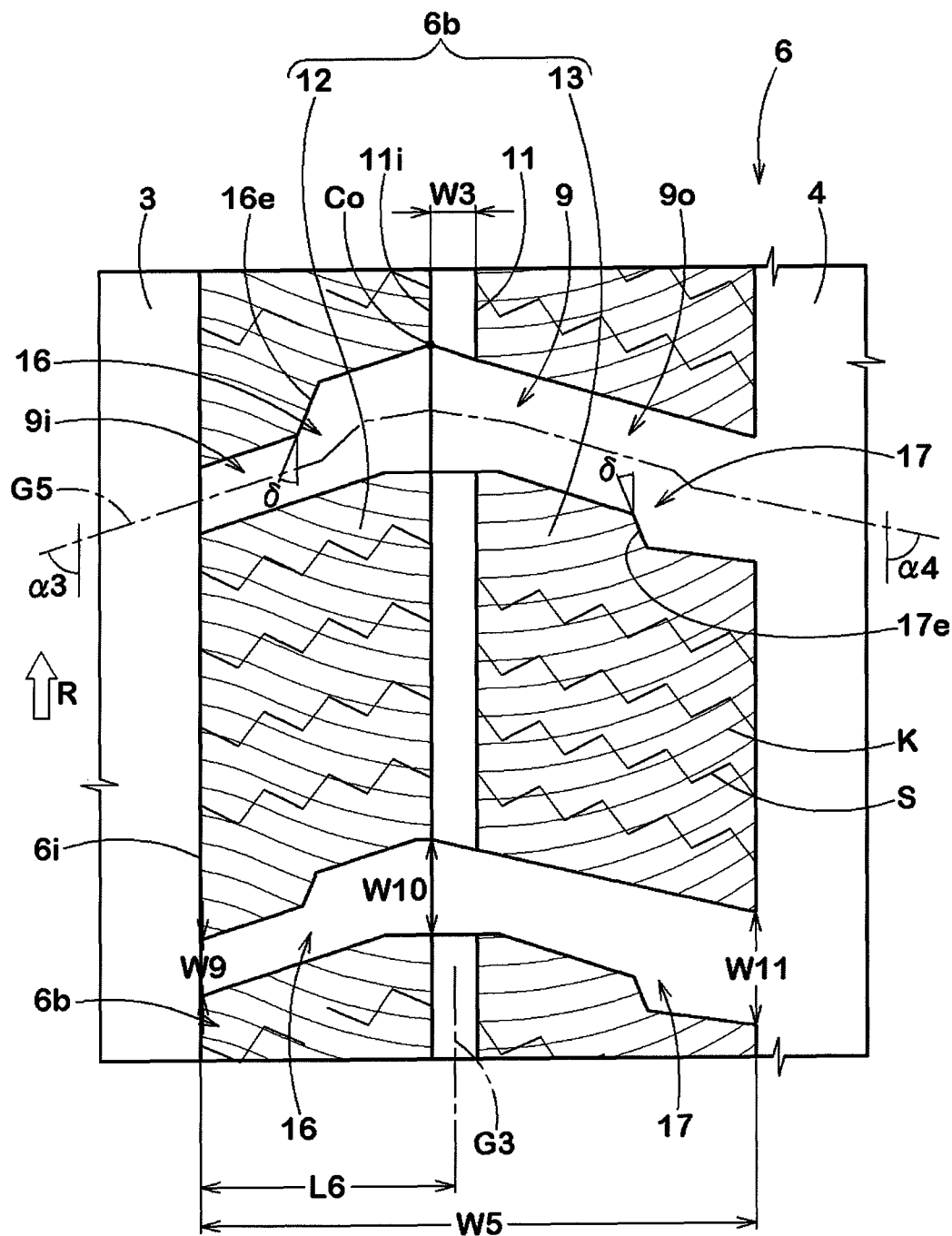
FIG. 5 is an enlarged top plan view of a part of a middle block row.

All of the middle axial grooves 9 in this embodiment have a same configuration as shown in FIG. 5.

Towards the designated tire rotational direction R, each of the middle axial grooves 9 is curved concavely so as to have a generally V-shape configuration.

The middle axial groove 9 is made up of an axially inner part 9i extending from the vertex Co of the V-shape to the crown main groove 3, while inclining to a direction opposite to the designated tire rotational direction R, and an axially outer part 9o extending from the vertex Co of the V-shape to the shoulder main groove 4, while inclining to a direction opposite to the designated tire rotational direction R.

Similarly to the crown axial grooves 8, the middle axial grooves 9 can lead the snow in the grooves smoothly into the crown main groove 3 and shoulder main groove 4, utilizing the ground pressure. Further, due to the V-shape, the total length of the edges of the middle axial groove 9 increases, and the grip performance on the icy roads can be improved.

The angle α3 of the widthwise center line G5 of the axially inner part 9i and the angle α4 of the widthwise center line G5 of the axially outer part 9o are preferably set in a range of from 65 degrees to 85 degrees with respect to the tire circumferential direction.

If the angle α3, α4 are more than 85 degrees, the resistance to the movement of the snow into the main groove 3, 4 becomes large.

If the angle α3, α4 are lass than 65 degrees, the grip performance on the icy roads tends to deteriorate.

The circumferential width of the middle axial groove 9 is increased gradually from the axially inside to the outside, and in this embodiment, as shown in FIG. 5, the increase is stepwise.

Therefore, the middle axial groove 9 can lead water and sherbet snow in the groove toward the direction of the less resistance, namely, toward the shoulder main groove 4 to be discharged outside the ground contacting patch of the tire.

The circumferential width of the middle axial groove 9 has a minimum value W9 at or near the axially inner end, an intermediate value W10 at the vertex Co, and a maximum value W11 and at or near the axially outer end, and the ratio W10/W9 and the ratio W11/W10 are set in a range of not less than 1.3, preferably not less than 1.5, but not more than 3.0, preferably not more than 2.5.

If the ratios W10/W9 and W11/W10 are more than 3.0, uneven wear is liable occur on the middle blocks 6b. If less than 1.3, self ejecting of the snow packed in the grooves becomes hard.

The middle axial groove 9 is provided with at least one increasing width part (16, 17) so that the width of the middle axial groove 9 increases steppedly from the resultant narrow width part, and at least one of the groove edges is provided between the increasing width part and resultant narrow width part with a short edge segment 16e, 17e extending at an angle δ of not more than 20 degrees with respect to the tire circumferential direction.

As a result, the total length of the groove edges is increased, and thereby the grip performance on the icy roads may be improved. Further, the snow-self-ejecting performance can be improved.

In this embodiment, the axially inner part 9i is provided with such increasing width part 16, and the increasing width part 16 is formed axially outside the resultant narrow width part, and the edge segment 16e is formed therebetween.

Also the axially outer part 9o is provided with such increasing width part 17, and the increasing width part 17 is formed axially outside the resultant narrow width part, and the edge segment 17e is formed therebetween.

In view of the grip performance on the icy roads, it is preferable that at least one such edge segment 16e, 17e is formed on each of the groove edges of the middle axial grooves 9.

In order to accelerate the drainage and snow discharge towards the shoulder main groove 4, it is preferred that, as shown in FIG. 3, the groove depth D7 of the axially outer part 9o is more than the groove depth D6 of the axially inner part 9i.

In order to provide rigidity for a part of the middle land portion 6 on the tire equator side where the ground pressure is larger, it is preferred that the groove depth D6 of the axially inner part 9i is not more than 95%, more preferably not more than 90% of the groove depth D1 of the crown main groove 3.

On the other hand, if the groove depth D6 becomes decreased, there is a possibility that the shearing force of the snow on the road surface packed into the groove becomes insufficient and the snow-self-ejecting performance deteriorates. Therefore, it is preferable that the groove depth D6 is not less than 50%, more preferably not less than 60% of the depth D1.

In this embodiment, the groove depth D7 of the axially outer part 9o is the same value as the groove depths D1 and D2 of the crown main groove 3 and shoulder main groove 4. But, it is also possible to set the groove depth D7 at different values.

In this embodiment, the middle blocks 6b are wider than the crown blocks 5b and shoulder blocks 7b. Therefore, in order to improve the drainage in the middle land portions 6, each of the middle land portions 6 is provided with a single middle narrow groove 11 as shown in FIGS. 2 and 5.

The middle narrow groove 11 extends straight and continuously in the tire circumferential direction. Thereby, the middle blocks 6b are each subdivided into an axially inner part 12 and an axially outer part 13.

As to the axial position of the middle narrow groove 11, in order to balance the drainage and the rigidity of the middle land portion 6, it is preferred that the widthwise center line G3 of the middle narrow groove 11 is positioned within a range between 30% and 60%, more preferably within a range between 40% and 50% of the middle block width W5 from the axially inside edge 6i of the middle block 6b towards the axially outside.

In this embodiment, the vertex Co of each of the middle axial grooves 9 is positioned at the axially inner edge 11i of the middle narrow groove 11.

Preferably, the groove width W3 of the middle narrow groove 11 is set in a range of from 2.0 to 4.0 mm. If less than 2.0 mm, the snow-self-ejecting performance deteriorates. If more than 4.0 mm, the rigidity of the middle land portion 6 (namely, the middle blocks 6b as a whole) decreases, and the steering stability is liable to deteriorate. For the same reason, it is preferred that the groove depth D3 (shown in FIG. 2) of the middle narrow groove 11 is not less than 50%, preferably not less than 55%, more preferably not less than 55%, but not more than 95%, preferably not more than 90%, more preferably not more than 70% of the groove depth D1 of the crown main groove 3.

Figure 6:
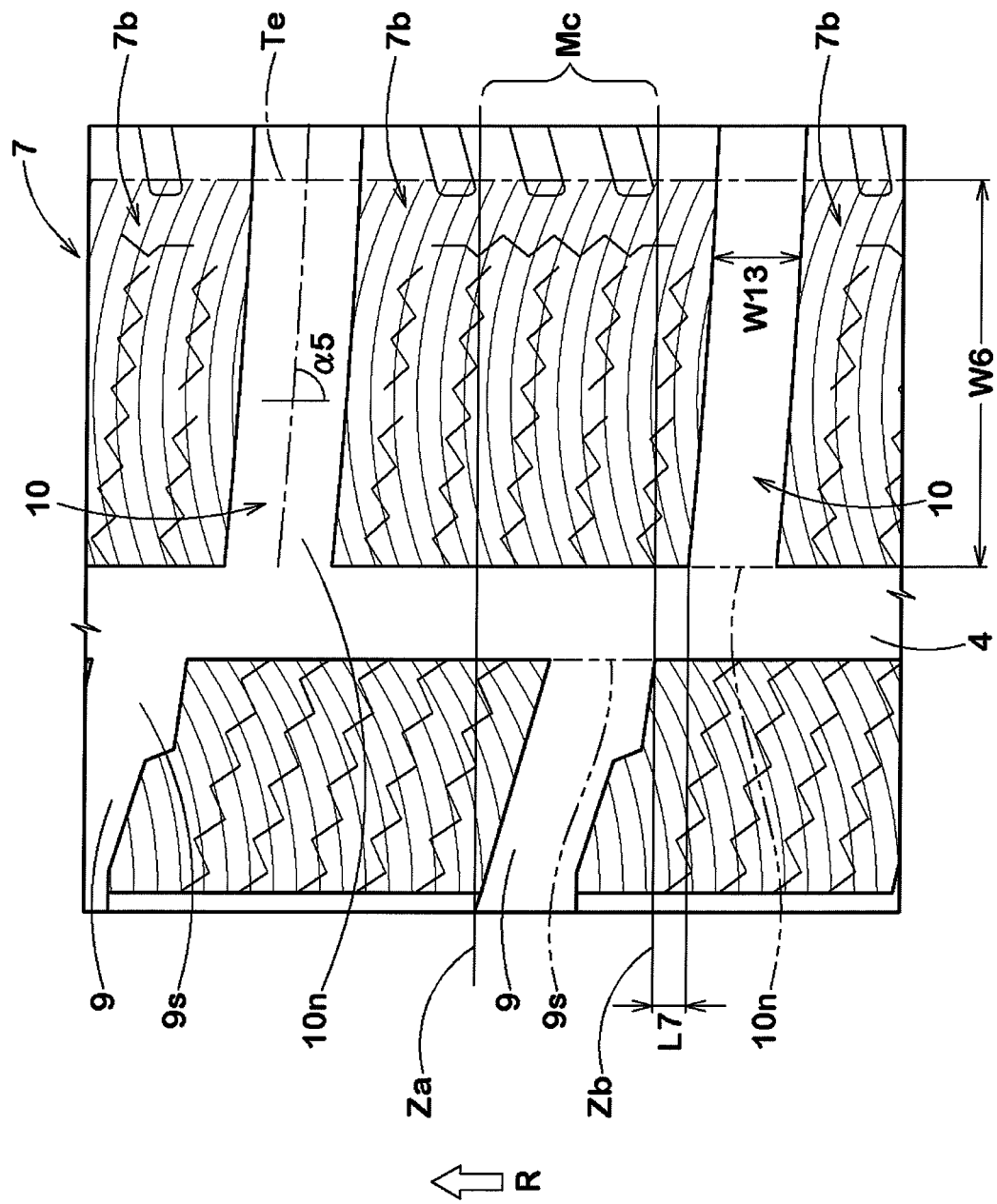
FIG. 6 is an enlarged top plan view of a part of a shoulder block row.

As shown in FIG. 6, the shoulder axial grooves 10 in this embodiment are substantially straight grooves which are substantially parallel with the tire axial direction.
More specifically, the angle α5 of the widthwise center line of the shoulder axial groove 10 is not more than 20 degrees with respect to the tire axial direction. Therefore, the shoulder blocks 7b become substantially rectangle in their top plan view.

In order to obtain a large shearing force of the packed snow in the tread shoulder regions, and to avoid an excessive decrease in the land ratio in the tread shoulder regions, it is desirable that the groove width W13 of the shoulder axial groove 10 is not less than 7.0 mm, more preferably not less than 8.0 mm, but not more than 10.0 mm, more preferably not more than 9.0 mm. And the groove depth D8 (shown in FIG. 3) of the shoulder axial groove 10 is in a range of from 90% to 100% of the groove depth D2 of the shoulder main groove 4. Incidentally, the land ratio is the ratio of the ground contacting area to the entire area (inclusive of the grooved area).

The pitch number Nc of the crown axial grooves 8 (namely, the number of the crown axial grooves 8 in the crown land portion 5),
the pitch number Nm of the middle axial grooves 9 (namely, the number of the middle axial grooves 9 in each of the middle land portions 6), and
the pitch number Ns of the shoulder axial grooves 10 (namely, the number of the shoulder axial groove 10 in each of the shoulder land portions 7)
are set in a range of from 55 to 85.
If the pitch numbers are less than 55, it becomes difficult to provide a sufficient grip performance on the snowy roads, and there is a tendency that running noise increases. If the pitch numbers are more than 85, it becomes difficult to provide a sufficient grip performance on the icy roads.

In this embodiment, the pitch numbers Nc, Nm and Ns are the same value.

According to the present invention, as shown in FIGS. 1 and 2, the middle axial grooves 9 disposed in one of (preferably each of) the middle land portions 6 are aligned with the crown axial grooves 8 with respect to the circumferential position such that each of the crown axial grooves 8 is positioned within one of middle-axial-groove ranges Mc.
The middle-axial-groove ranges Mc are each defined by one of the middle axial grooves 9 as a range between a 1st axial straight line Za and a 2nd axial straight line Zb drawn parallel to the tire axial direction, passing the 1st and 2nd extreme circumferential end points 9a and 9b of the middle axial groove 9 lying on the leading edge and trailing edge of the middle axial groove 9, respectively.
In this embodiment, the extreme circumferential end points 9a corresponds to the above-mentioned vertex Co.
Therefore, each of middle-axial-groove ranges Mc includes one of the crown axial grooves 8 and one of the middle axial grooves 9, and there is possibility that one of the middle axial grooves 9 in the other middle land portion 6 is further included in this range Mc. As a result, in the central region of the tread portion 2 where the ground pressure is relatively high, two or more axial grooves 8 and 9 enter the ground contacting patch at the same time, and the shearing force of the snow packed into these grooves increases, therefore, a large traction force and braking force can be obtained.

In the embodiment shown in FIG. 1, the axial lines Za and Zb drawn from the extreme circumferential end points 9a and 9b of one of the middle axial grooves 9 of one of the middle land portions 6 pass through the extreme circumferential end points 9a and 9b of one of the middle axial grooves 9 of the other of the middle land portions 6.
In other words, the middle-axial-groove ranges Mc defined by the middle axial grooves 9 of one of the middle land portions 6 completely overlap with the middle-axial-groove ranges Mc defined by the middle axial grooves 9 of the other of the middle land portions 6, respectively.
Thus, three axial grooves 9, 8 and 9 exist in every middle-axial-groove range Mc.

In a case that the middle axial grooves 9 of one of the middle land portions 6 are not symmetrical with the middle axial grooves 9 of the other of the middle land portions 6, there is a possibility that one of the corresponding two middle-axial-groove ranges Mc completely encompass the other, and as a result, three axial grooves 9, 8 and 9 exist.

The circumferential length Lm of each of the middle-axial-groove ranges Mc is set in a range of not less than 25%, preferably not less than 30%, more preferably not less than 35%, but not more than 50%, preferably not more than 45%, more preferably not more than 40% of the circumferential pitch length P of the middle axial grooves 9 measured between the extreme circumferential end points 9a as shown in FIG. 2. Thereby, the circumferential component of the middle axial groove 9 increases, and the cornering grip performance on the snowy roads may be improved, without sacrificing the grip performance during straight running.

As shown in FIG. 2, it is preferable that the opening 8s of the crown axial groove 8 at the crown main groove 3 and the opening 9n of the middle axial groove 9 at the crown main groove 3 are at least partially overlap with each other in the tire circumferential direction.

In this embodiment, the opening 9n of the middle axial groove 9 is smaller in the circumferential width than the opening 8s of the crown axial groove 8, and the entire width of the opening 9n overlaps with the opening 8s.

When running on snowy roads, such cruciform arrangement of the crown axial groove 8, middle axial groove 9 and crown main groove 3 can form stiff cross-shaped packed snow in each cross, therefore, the snow shearing force is increased, and the grip performance on the snowy roads may be further improved.

on the other hand, the shoulder axial grooves 10 in this embodiment are circumferentially shifted from the crown axial grooves 8 and middle axial grooves 9.
More specifically, each of the shoulder axial grooves 10 does not overlap with any of the middle-axial-groove ranges Mc, and is positioned between the middle-axial-groove ranges Mc on the same side of the tire equator.
Therefore, the circumferential positions at which large snow shearing forces can be obtained are dispersed, and the grip performance on the snowy roads may be further improved.
In order to further increase the increased snow shearing force obtained by the aligned crown axial groove and middle axial groove, it is preferable that the circumferential distance L7 between the opening 10n of the shoulder axial groove 10 at the shoulder main groove 4 and the opening 9s of the middle axial groove 9 at the shoulder main groove 4 is set to be not more than 10 mm, more preferably not more than 5 mm.

In order to improve the grip performance on the icy roads, each of the blocks 5b, 6b and 7b is provided with a plurality of sipes S and a plurality of incisions K.

The sipes S of each block extend zigzag in the tire axial direction.

The incisions K of each block extend generally in the tire axial direction, while gently curving towards the same circumferential direction.

The groove width and depth of the incision K is from 0.1 to 2.0 mm. The groove width of the sipe S is from 0.1 to 2.0 mm. The groove depth of the sipe S is more than that of the incision K, but less than the depths D1 and D2 of the main grooves 3 and 4. Therefore, in the initial stage of the tread wear life, the performance of the tire as a studless winter tire can be further improved, while also achieving the tread wear performance, steering stability and the like of the tire when used as a summer tire from the middle stage to final stage of the tread wear life, As shown in FIGS. 4, 5 and 6, towards the designated tire rotational direction R, the incisions K in the crown blocks 5b and middle blocks 6b are curved convexly. But, the incisions K in the shoulder blocks 7b are curved concavely. Therefore, it is possible to derive maximum edge effects under various road conditions to improve on-the-ice performances.

The land ratio ET of the entire tread portion 2 is preferably set in a range of not less than 60%, more preferably not less than 61%, but not more than 73%, more preferably not more than 71%.

If the land ratio ET is more than 73%, the shearing force of the packed snow decreases and there is a tendency that on-the-snow performance is deteriorated. If the land ratio ET is less than 60%, there is a tendency that the grip performance on the icy roads decreases.

Comparison Tests

Studless radial tires of size 265/70R16 for passenger cars were prepared and tested as follows.

All of the tires had same structures, except for the specifications shown in Table 1.

The specifications common to all of the tires are as follows,
Tread width TW: 183 mm
Crown main groove
Width W1: 6.8 mm
Depth D1: 11.2 mm
Position Wc/TW: 9.5%
Shoulder main groove
Width W2: 7.3 mm
Depth D2: 11.2 mm
Position Ws/TW: 31.1%
Middle narrow groove
Width W3: 3.2 mm
Depth D3: 7.0 mm
Position L6/W5: 44%
Shoulder axial groove
Width W13: 8.5 mm
Depth D8: 11.2 mm
Land ratio ET: 67%
pitch number Nc, Nm, Ns: 68

Figure 7A:
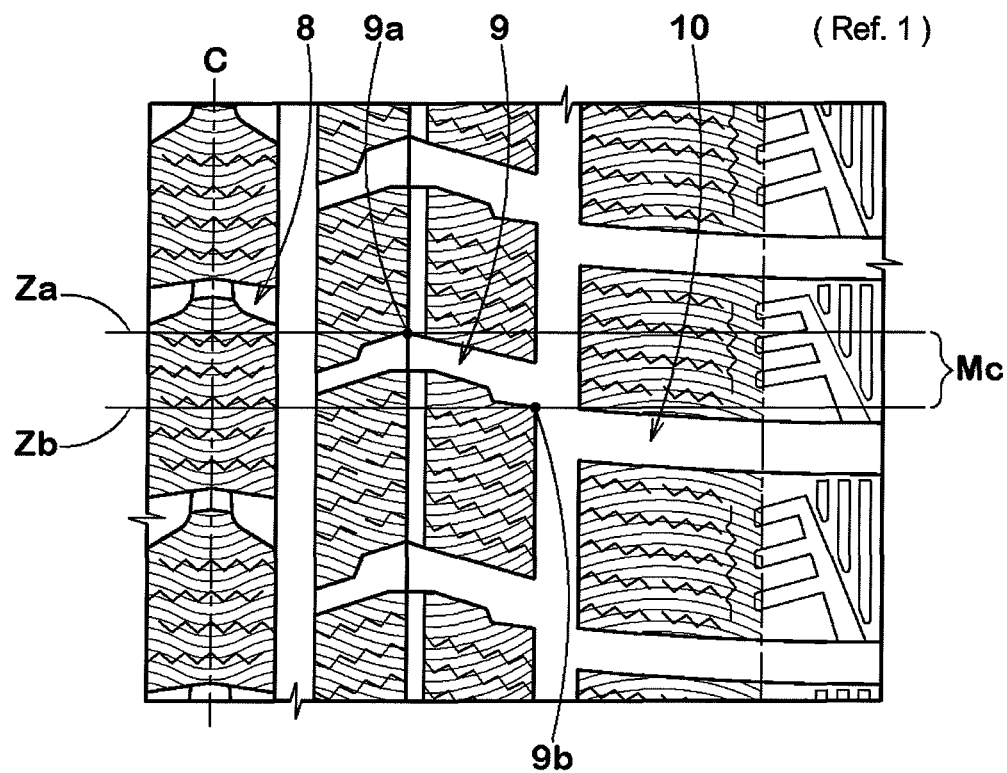
FIG. 7(a) is a developed partial view of a tread portion of Ref.1 tire used in the undermentioned comparison tests.

In the tread pattern shown in FIG. 7(a), the crown axial grooves were formed outside the middle-axial-groove ranges.

Figure 7B:
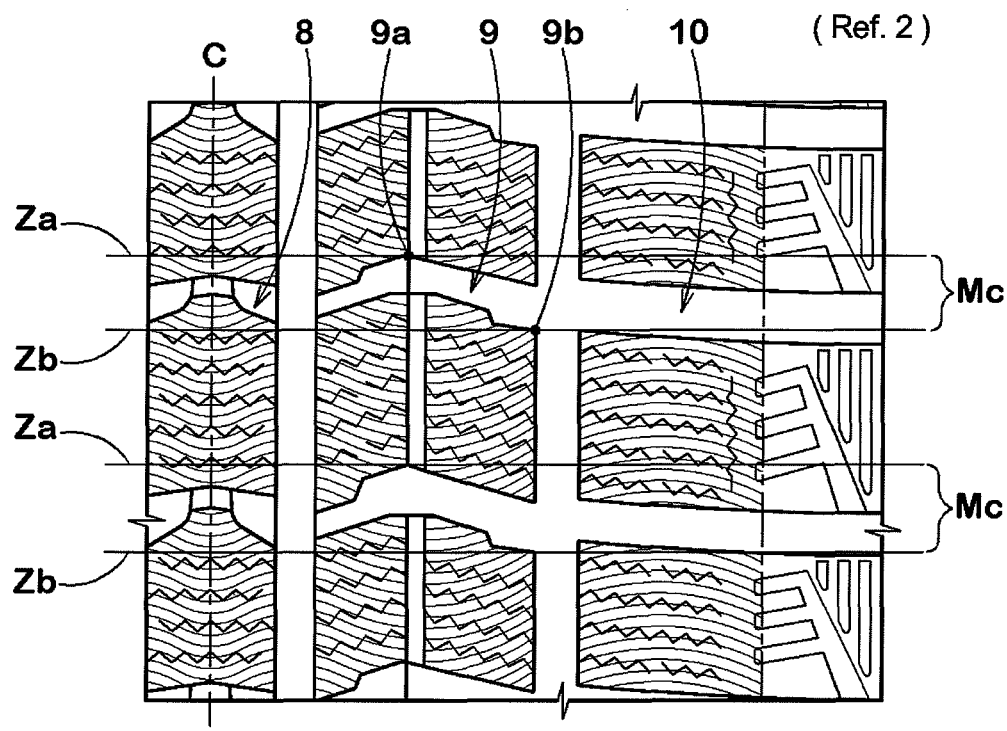
FIG. 7(b) is a developed partial view of a tread portion of Ref.2 tire used in the undermentioned comparison tests.

In the tread pattern shown in FIG. 7(b), the crown axial grooves and shoulder axial grooves were formed within the middle-axial-groove ranges.

By the use of a test car (a 3500 cc sport-utility vehicle provided on the four wheels with the same kind of test tires mounted on a rim of size 7.0×16 and inflated to 200 kPa), the following tests were carried out.

Before subjected to the tests, all of the test tires were run on a dry asphalt road for 100 km.

On-the-snow & Icy Performance Test:

The test car was run on a snowy road surface and icy road surface in a tire test course, and the tire was evaluated by the test driver based on the steering response, braking performance, traction performance and road grip.

The results are indicated in Table 1 by an index based on Ref.1 being 100, wherein the larger the value, the better the performance.

On-the-snow Climbing Performance Test:

In a test circuit course of 2 kilometers including a snow-covered climbing road surface, the test car was run for five laps, and the total of the lap times was obtained.

The reciprocal number of the obtained total lap time is indicated in Table 1 by an index based on Ref.1 tire being 100, wherein the larger the value, the better the performance.

On-the-Icy Braking Performance Test:

The test car was run on the icy road surfaces at a speed of 30 km/h, and four-wheel-lock braking was made and the braking distance to stop was measured.

The reciprocal number of the measured braking distance is indicated in Table 1 by an index based on Ref.1 tire being 100. wherein the larger the value, the better the performance.

Uneven Wear Resistance Test:

The test car was run on a dry asphalt road surface for 3000 km. Then, the difference in amount of wear between circumferential edges of block (called heel-and-wear wear) was measured with respect to three blocks at circumferential different positions, and their mean value was calculated.

The mean values are indicated by an index based on Ref.1 tire being 100, wherein the larger the value, the better the uneven wear resistance.

From the test results, it was confirmed that the running performance on the snowy/icy roads can be significantly improved without sacrificing the uneven wear resistance.

TABLE 1

| | Tire | | | | | | | | | | | | | | | | |
| --- | --- | --- | --- | --- | --- | --- | --- | --- | --- | --- | --- | --- | --- | --- | --- | --- | --- |
| | Ref. 1 | Ref. 2 | Ref. 3 | Ex. 1 | Ex. 2 | Ref. 4 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
| Tread pattern (Fig.) | 7(a) | 7(b) | 1 | 1 | 1 | 1 | 1 | 1 | 1 | 1 | 1 | 1 | 1 | 1 | 1 | 1 | 1 |
| Lm/P (%) | 35 | 35 | 15 | 25 | 45 | 55 | 35 | 35 | 35 | 35 | 35 | 35 | 35 | 35 | 35 | 35 | 35 |
| L1/W4 (%) | 20 | 20 | 20 | 20 | 20 | 20 | 20 | 40 | 50 | 30 | 30 | 30 | 30 | 30 | 30 | 30 | 30 |
| W7/W8 | 1.2 | 1.2 | 1.2 | 1.2 | 1.2 | 1.2 | 1.2 | 1.2 | 1.2 | 1.2 | 1.5 | 2.5 | 3.5 | 2.0 | 2.0 | 2.0 | 2.0 |
| W10/W9 | 1.3 | 1.3 | 1.3 | 1.3 | 1.3 | 1.3 | 1.3 | 1.3 | 1.3 | 1.3 | 1.3 | 1.3 | 1.3 | 1.3 | 1.8 | 2.2 | 3.6 |
| W11/W10 | 1.3 | 1.3 | 1.3 | 1.3 | 1.3 | 1.3 | 1.3 | 1.3 | 1.3 | 1.3 | 1.3 | 1.3 | 1.3 | 1.3 | 1.8 | 2.2 | 3.6 |
| on-the-ice performance | 100 | 98 | 102 | 101 | 99 | 98 | 100 | 101 | 101 | 101 | 100 | 99 | 98 | 100 | 100 | 99 | 97 |

TABLE 1-continued

| | Tire | | | | | | | | | | | | | | | | |
|---|---|---|---|---|---|---|---|---|---|---|---|---|---|---|---|---|---|
| | Ref. 1 | Ref. 2 | Ref. 3 | Ex. 1 | Ex. 2 | Ref. 4 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
| on-the-snow performance | 100 | 95 | 98 | 107 | 108 | 106 | 110 | 109 | 107 | 110 | 112 | 113 | 113 | 112 | 114 | 115 | 116 |
| on-the-snow climbing performance | 100 | 102 | 96 | 105 | 105 | 103 | 110 | 110 | 108 | 110 | 110 | 112 | 113 | 112 | 114 | 114 | 114 |
| on-the-icy braking performance | 100 | 100 | 102 | 101 | 99 | 97 | 100 | 101 | 101 | 100 | 100 | 99 | 98 | 100 | 100 | 99 | 98 |
| uneven wear resistance | 100 | 100 | 103 | 102 | 99 | 99 | 100 | 102 | 102 | 102 | 102 | 102 | 100 | 102 | 102 | 101 | 100 |

| * Reference signs List | |
|---|---|
| 2 | tread portion |
| 3 | crown main groove |
| 4 | shoulder main groove |
| 5 | crown land portion |
| 5R | crown block row |
| 6 | middle land portion |
| 6R | middle block row |
| 7 | shoulder land portion |
| 7R | shoulder block row |
| 8 | crown axial groove |
| 9 | middle axial groove |
| 9a | 1st extreme circumferential end point of middle axial groove |
| 9b | 2nd extreme circumferential end point of middle axial groove |
| 10 | shoulder axial groove |
| C | tire equator |
| Mc | middle-axial-groove range |
| Lm | circumferential length of middle-axial-groove range |
| Za | 1st axial line |
| Zb | 2nd axial line |
| P | pitch length |
| Te | tread edge |

The invention claimed is:

1. A pneumatic tire comprising
a tread portion provided on each side of a tire equator (C) with an axially inner crown main groove and an axially outer shoulder main groove which extend continuously in the tire circumferential direction so that the tread portion is axially divided into one crown land portion between the crown main grooves, two middle land portions between the crown main grooves and shoulder main grooves, and two shoulder land portions between the shoulder main grooves and tread edges (Te),
wherein the crown land portion is circumferentially divided into a row of circumferentially arranged crown blocks by crown axial grooves,
each of the middle land portions is circumferentially divided into a row of circumferentially arranged middle blocks by middle axial grooves, and
each of the shoulder land portions is circumferentially divided into a row of circumferentially arranged shoulder blocks by shoulder axial grooves,
wherein each of said crown axial grooves is circumferentially aligned with one of the middle axial grooves on one side of the tire equator (C) and the middle axial grooves on the other side of the tire equator (C) such that said each crown axial groove is positioned within a middle-axial-groove range (Mc) which is defined by said one middle axial groove as being between 1st and 2nd axial straight lines (Za and Zb) which are drawn passing through 1st and 2nd extreme circumferential end points of said one middle axial groove, respectively,
wherein the circumferential length of the middle-axial-groove range (Mc) is not less than 25% but not more than 50% of a pitch length (P) of the middle axial grooves, the pitch length (P) defined between said 1st extreme circumferential end point and that of the middle axial groove next to said 2nd extreme circumferential end point, and
said middle-axial-groove range (Mc) defined by said one middle axial groove does not overlap with any of the shoulder axial grooves formed on the same side of the tire equator (C) as said one middle axial groove, and wherein the tread portion is provided with a unidirectional tread pattern having a designated tire rotational direction (R), and towards one circumferential direction corresponding to the designated tire rotational direction (R), all of the middle axial grooves are curved concavely to have generally V-shape configurations.

2. The pneumatic tire according to claim 1, wherein said each crown axial groove has said one middle axial groove on each side of the tire equator (C).

3. The pneumatic tire according to claim 1, wherein towards one circumferential direction corresponding to the designated tire rotational direction (R), all of the crown axial grooves are curved concavely to have generally V-shape configurations.

4. The pneumatic tire according to claim 1, wherein each of openings of the crown axial grooves opened to the two crown main grooves is at least partially overlapped in the tire circumferential direction with one of openings of the middle axial grooves opened to the two crown main grooves.

5. The pneumatic tire according to claim 4, wherein openings of the middle axial grooves opened to one of the shoulder main grooves are each overlapped in the tire circumferential direction with none of openings of the shoulder axial grooves opened to said one shoulder main groove, and
the circumferential distances between said openings of the middle axial grooves and said openings of the shoulder axial grooves are not more than 20 mm.

6. A pneumatic tire comprising
a tread portion provided on each side of a tire equator (C) with an axially inner crown main groove and an axially outer shoulder main groove which extend continuously in the tire circumferential direction so that the tread portion is axially divided into one crown land portion between the crown main grooves, two middle land portions between the crown main grooves and shoulder main grooves, and two shoulder land portions between the shoulder main grooves and tread edges (Te), wherein the crown land portion is circumferentially divided into a row of circumferentially arranged crown blocks by crown axial grooves, each of the middle land portions is circumferentially divided into a row of circumferentially arranged middle blocks by middle axial grooves, and each of the shoulder land portions is circumferentially divided into a row of circumferentially arranged shoulder blocks by shoulder axial grooves, characterized in that each of said crown axial grooves is circumferentially aligned with one of the middle axial grooves on one side of the tire equator (C) and the middle axial grooves on the other side of the tire equator (C) such that said each crown axial groove is positioned within a middle-axial-groove range (Mc) which is defined by said one middle axial groove as being between 1st and 2nd axial straight lines ($Za$ and $Zb$) which are drawn passing through 1st and 2nd extreme circumferential end points of said one middle axial groove, respectively, wherein the circumferential length of the middle-axial-groove range (Mc) is not less than 25% but not more than 50% of a pitch length (P) of the middle axial grooves, the pitch length (P) defined between said 1st extreme circumferential end point and that of the middle axial groove next to said 2nd extreme circumferential end point, and said middle-axial-groove range (Mc) defined by said one middle axial groove does not overlap with any of the shoulder axial grooves formed on the same side of the tire equator (C) as said one middle axial groove, wherein the circumferential width of each of the middle axial grooves gradually increases from the axially inside to outside of the tire.

7. A pneumatic tire comprising a tread portion provided on each side of a tire equator (C) with an axially inner crown main groove and an axially outer shoulder main groove which extend continuously in the tire circumferential direction so that the tread portion is axially divided into one crown land portion between the crown main grooves, two middle land portions between the crown main grooves and shoulder main grooves, and two shoulder land portions between the shoulder main grooves and tread edges (Te), wherein the crown land portion is circumferentially divided into a row of circumferentially arranged crown blocks by crown axial grooves, each of the middle land portions is circumferentially divided into a row of circumferentially arranged middle blocks by middle axial grooves, and each of the shoulder land portions is circumferentially divided into a row of circumferentially arranged shoulder blocks by shoulder axial grooves, wherein each of said crown axial grooves is circumferentially aligned with one of the middle axial grooves on one side of the tire equator (C) and the middle axial grooves on the other side of the tire equator (C) such that said each crown axial groove is positioned within a middle-axial-groove range (Mc) which is defined by said one middle axial groove as being between 1st and 2nd axial straight lines ($Za$ and $Zb$) which are drawn passing through 1st and 2nd extreme circumferential end points of said one middle axial groove, respectively, wherein the circumferential length of the middle-axial-groove range (Mc) is not less than 25% but not more than 50% of a pitch length (P) of the middle axial grooves, the pitch length (P) defined between said 1st extreme circumferential end point and that of the middle axial groove next to said 2nd extreme circumferential end point, and said middle-axial-groove range (Mc) defined by said one middle axial groove does not overlap with any of the shoulder axial grooves formed on the same side of the tire equator (C) as said one middle axial groove, wherein each of the middle land portions is provided with a circumferentially continuously extending middle narrow groove.

\* \* \* \* \*